United States Patent [19]

Peng

[11] Patent Number: 5,457,578
[45] Date of Patent: Oct. 10, 1995

[54] COLOR FILTER TRANSMISSION APPARATUS

[75] Inventor: Herry Peng, Hsinchu, Taiwan

[73] Assignee: Umax Data Systems Inc., Hsinchu, Taiwan

[21] Appl. No.: 304,276

[22] Filed: Sep. 12, 1994

[51] Int. Cl.$^6$ .................................................. G02B 5/22
[52] U.S. Cl. .................... 359/892; 359/887; 359/889; 359/891
[58] Field of Search ...................... 359/887, 889, 359/891, 892, 601, 607, 890

[56] References Cited

U.S. PATENT DOCUMENTS

| | | | |
|---|---|---|---|
| 2,934,172 | 3/1955 | Christie | 359/887 |
| 3,679,290 | 7/1972 | Adams et al. | 359/887 |
| 5,122,911 | 6/1992 | Kuo | 359/891 |
| 5,276,556 | 1/1994 | Wang | 359/889 |

*Primary Examiner*—Paul M. Dzierzynski
*Assistant Examiner*—Mohammad Y. Sikder
*Attorney, Agent, or Firm*—W. Wayne Liauh

[57] ABSTRACT

A color filter moving apparatus for moving a color filter comprising a base and a filter frame. The base is provided with (1) a side flange integrally formed on a lateral side of the base; (2) a motor mounted on a lateral wall of the side flange, the motor having an axle penetrating through the lateral wall so as to allow a gear to be attached thereto; and (3) two protrudent flanges formed on the two ends, respectively, of the base, each protrudent flange having a stud opening. The filter frame is provided with (1) a side wall, a bottom, and a top wall, the top wall having an outer face and an inner face; (2) at least one frame rack formed on the side wall of the filter frame for holding a color filter; and (3) a gear track formed on the inner face of the top wall engageable with the gear attached to the axle of the motor. The apparatus further comprises (1) a guiding rod having two ends and a stud on each of the ends thereof, the studs being engageable with the two stud openings, respectively, of the protrudent flanges so as to allow the guiding rod to be disposed between the two protrudent flanges; (2) a plurality of axle sleeves affixed to the bottom of the filter frame which are engageable with the guiding rod so as to allow the filter frame to travel closely along the guiding rod; (3) a longitudinal protrusion formed on the outer face of the top wall of the filter frame, the longitudinal protrusion being disposed closely between the top wall of the filter frame and the top wall of the side flange; (4) a protrudent stud formed on the top wall of the side flange which, in cooperation with the longitudinal protrusion, limits the swaying of the filter frame; and (5) a spring clip adapted to latch about one of the protrudent flanges, the spring clip having an opening engageable with one of the stud of the guiding rod so as to facilitate an easy assembly and dis-assembly of the guiding rod, and therefor the filter frame, with respective to the base.

4 Claims, 5 Drawing Sheets

2

COLOR FILTER TRANSMISSION APPARATUS

BACKGROUND OF THE INVENTION

In a conventional optical scanner, the filter apparatus can have different structure.

One of conventional apparatus (referring to FIG. 1) composes of a filter frame (a), a stepping motor (not shown), two large gears (b), two pinions (c), (d). A guiding channel (not shown) is disposed on the base to hold filter frame (a) and allows it to move steadily thereon.

Filter frame (a) is controlled by a pinion (d), two large gears (b) and a pinion (c) attached on motor axle (e). It has the shortcoming of too complicated structure and not easy to assemble or dismantle. It requires a screw driver or other tools to remove or assemble the filter assembly.

SUMMARY OF THE INVENTION

The present invention relates to a color filter transmission apparatus in color optical system that is simple to assemble or dismantle and does not need additional transmission medium or gear to achieve the required function.

The primary object of the present invention is to provide a color filter apparatus that is simple in structure, easy to assemble or dismantle, and without downgrading its function. The transmission between motor and filter frame is through the direct engagement between gear rack on the frame and the pinion on motor axle, does not go through transmission medium or gear, thereby remove other transmission medium or gear. Furthermore, the assembly or dismantle can be done by snap-fit between a spring clip and a guiding rod, thereby reduce the cost of structure and shorten the assembly or dismantling time needed. Thus greatly improve the structure simplicity.

DETAILED DESCRIPTION

Figure 1:
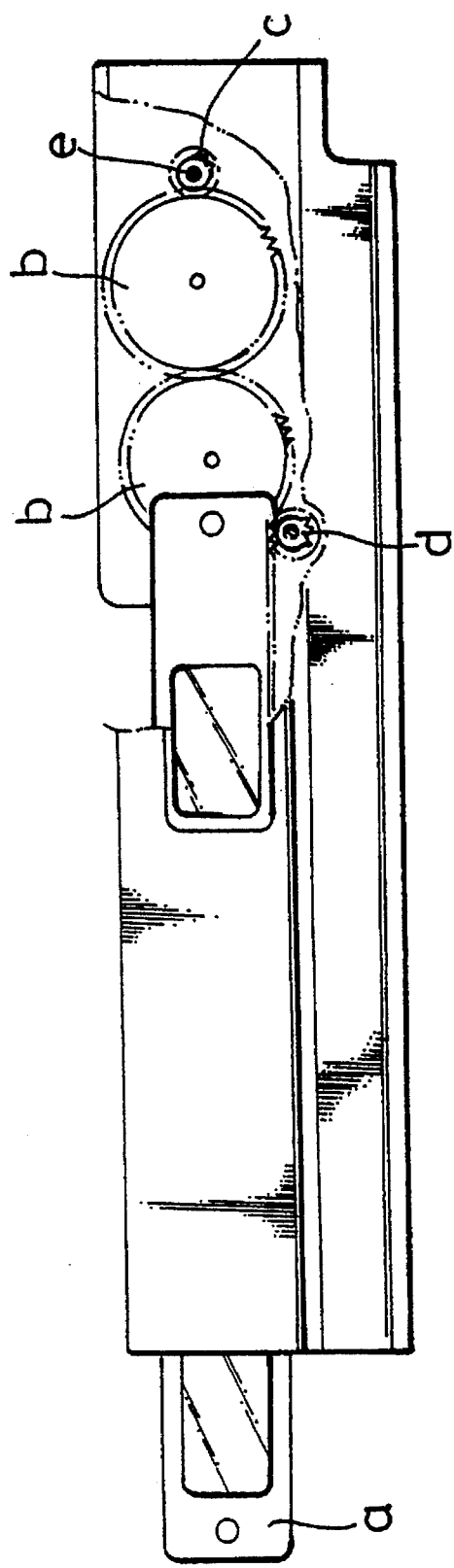
FIG. 1 is a fragmentary cut away plan view of filter apparatus of a conventional optical scanner.
Figure 2:
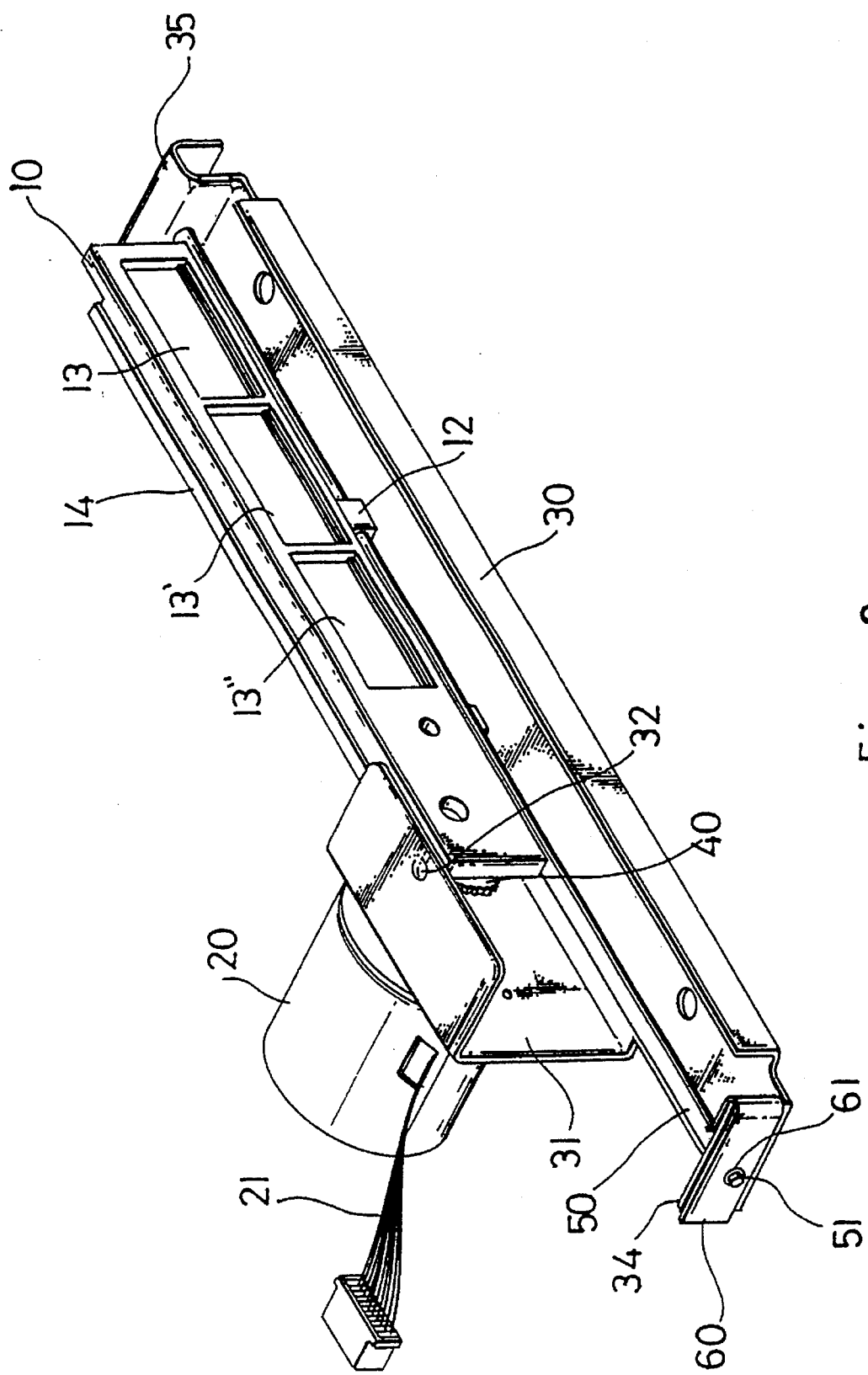
FIG. 2 is a perspective view of the present invention.
Figure 3:
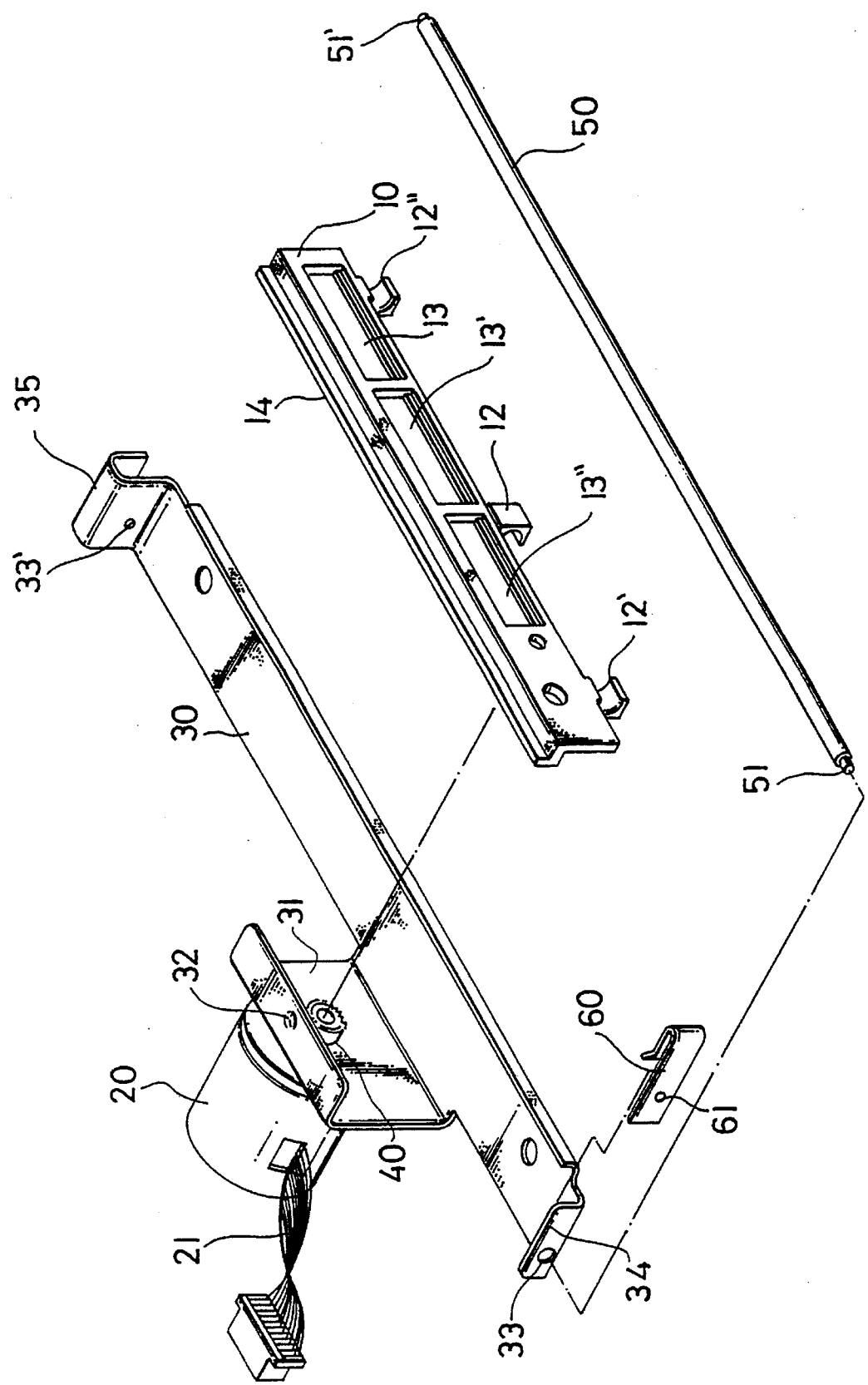
FIG. 3 is an exploded view of the present invention.
Figure 4:
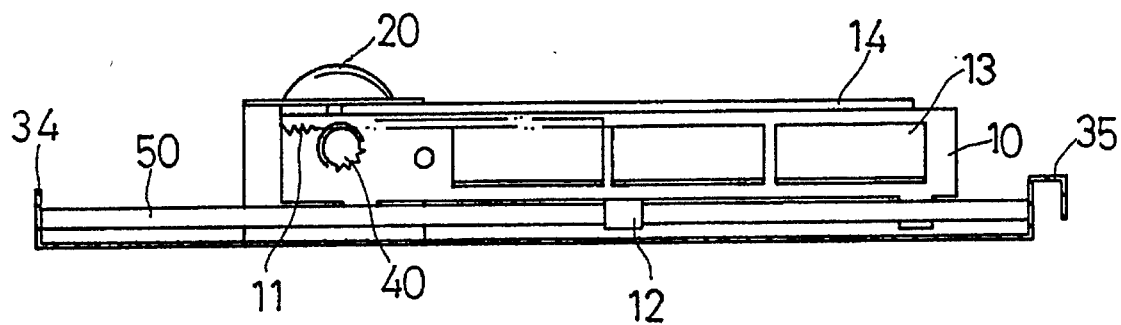
FIG. 4 is an elevation view of the present invention.
Figure 5:
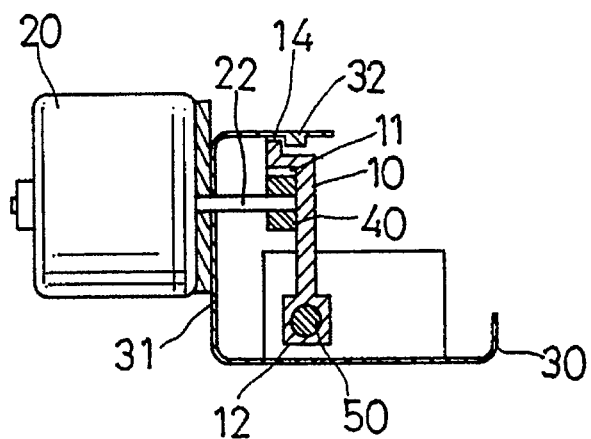
FIG. 5 is a side view of the present invention.
Figure 6:
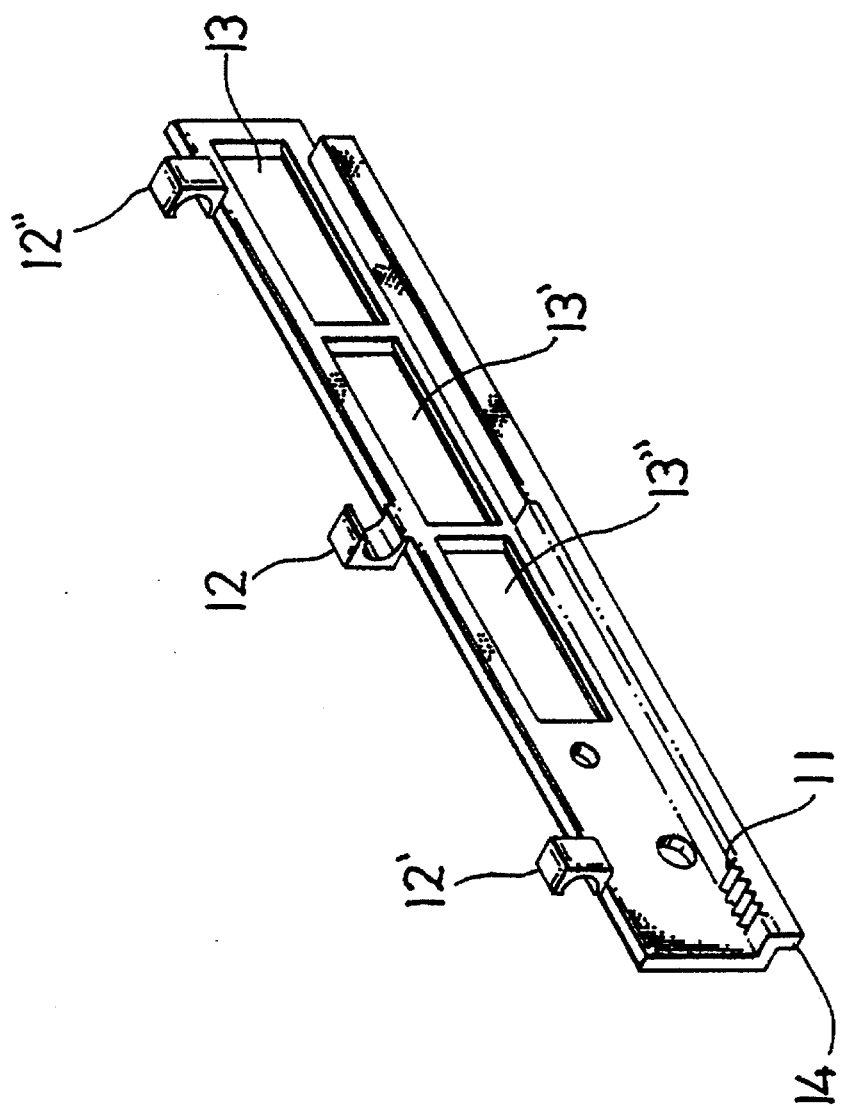
FIG. 6 is a perspective view of a filter frame of the present invention.

Referring to FIG. 2 and 3, the present invention composes of a filter frame (10), a stepping motor (20), a base (30), a gear (40), a guiding rod (50) and a spring clip (60). A gear rack (11) is disposed on the inside wall of filter frame (10) (also referring to FIG. 6). Gear rack (11) engages with gear (40) which attached on axle (22) of motor (20) (referring to FIG. 5), thereby stepping motor (20) can move and control the position of gear rack (11) and filter frame (10) without other transmission medium or gear.

Under bottom of filter frame (10), there are disposed three axle sleeves (12), (12'), (12"), sleeve (12'), (12") on the two ends have the same opening direction. Sleeve (12) in the middle has opposite opening direction against that of sleeve (12'), (12"). Guiding rod (50) engages with axle sleeves (12), (12') and (12") closely. Filter frame (10) is movable longitudinally along guiding rod (50). Three sets of frame rack (13), (13'), (13") are provided to hold filter of red, green and blue respectively. An integral side flange (31) is formed on one lateral side of base (30) and holds stepping motor (20) thereon. A protrudent stud (32) is formed on the top wall of side flange (31) to engage with a protrudent channel (14) formed on the top of filter frame (10) thereby to reduce the swaying of filter frame (10) when it is moving along guiding rod (50), and to increase the steadiness of filter frame (10) when it is moving. Base (30) has two protrudent flanges (34), (35) formed respectively on its two ends. There is a small opening (33), (33') formed respectively on protrudent flange (34), (35) to engage with stud (51), (51') formed on the two ends of guiding rod (50). A spring clip (60) latches on protrudent flange (34). A small opening (61) on spring clip (60) also engages with stud (51). Such that filter frame (10) and guiding rod (50) can be firmly disposed on base (30). Stepping motor (20) has electric wire (21) to connect with control circuit which control filter frame (10) to move to the desired location.

When there is a need to dismantle the filter frame, it can be done by moving spring clip (60) and disengage stud (51) from opening (61), and move out guiding rod (50) to change filter frame (10).

Due to the present invention has small number of transmission medium, it can provide a better transmission efficiency and rapid assembly or dismantling of filter assembly when applying in optical scanner.

I claim:

1. A color filter transmission apparatus comprising:

a base having two lateral sides and two ends;

a side flange integrally formed on one of said lateral sides of said base, said side flange having a top wall and a lateral wall;

a motor mounted on said lateral wall of said side flange, said motor having an axle penetrating through said lateral wall so as to allow a gear to be attached thereto on an opposite side of said lateral wall;

two protrudent flanges formed on said two ends, respectively, of said base, each protrudent having a stud opening;

a filter frame having a side wall, a bottom, and a top wall, said top wall having an outer face and an inner face;

at least one frame rack formed on said side wall of said filter frame for holding a light filter;

a gear track formed on said inner face of said top wall of said filter frame for engaging with said gear attached to said axle of said motor;

wherein said apparatus further comprises a guiding rod having two ends and a stud on each of said ends thereof, said studs being engageable with said two stud openings, respectively, of said protrudent flanges so as to allow said guiding rod to be disposed between said protrudent flanges;

a plurality of axle sleeves affixed to said bottom of said filter frame which are engageable with said guiding rod so as to allow said filter frame to travel closely along said guiding rod;

a longitudinal protrusion formed on said outer face of said top wall of said filter frame, said longitudinal protrusion being disposed closely between said top wall of said filter frame and said top wall of said side flange;

a protrudent stud formed on said top wall of said side flange which, in cooperation with said longitudinal protrusion, limits the swaying of said filter frame;

a spring clip adapted to latch about one of said protrudent flanges, said spring clip having an opening engageable with one of said stud of said guiding rod so as to facilitate an easy assembly and dis-assembly of said guiding rod, and therefor said filter frame, with respective to said base.

2. An apparatus of claim 1 which comprises a plurality of frame racks on said side wall of said filter frame.

3. An apparatus of claim 1 wherein said light filter is a color filter.

4. An apparatus of claim 1 wherein said filter is a filter capable of reducing radiative light.

* * * * *